Aug. 20, 1968

E. MOEGLING 3,397,677

REFUSE BOILER IN COMBINATION WITH A HIGH
PRESSURE POWER STATION BOILER

Filed April 21, 1967

INVENTOR.
Eugen Moegling

BY

ATTORNEY

United States Patent Office 3,397,677
Patented Aug. 20, 1968

3,397,677
REFUSE BOILER IN COMBINATION WITH A HIGH PRESSURE POWER STATION BOILER
Eugen Moegling, Duisburg-Gross Benbaum, Germany, assignor to Babcock & Wilcox, Limited, London, England, a company of Great Britain
Filed Apr. 21, 1967, Ser. No. 632,592
Claims priority, application Germany, Apr. 21, 1966, D 49,910
6 Claims. (Cl. 122—2)

ABSTRACT OF THE DISCLOSURE

A refuse boiler system connected in parallel operative relationship with a high pressure power boiler system whereby steam generated in the refuse boiler is passed through an indirect heat exchanger to heat the feedwater destined for the high pressure boiler. The two systems operate independently of each other and a stand-by condenser is included to receive the refuse boiler steam in case the power boiler system is shutdown. An alternate arrangement shows the refuse boiler steam being delivered to the low pressure stage of the power system turbine.

---

This invention relates to a steam generating system, and more particularly to a system wherein a refuse boiler is combined with a high pressure power boiler.

The modern power plants using coal, oil or gas fired high pressure boilers will often include refuse boiler installations to generate steam at an intermediate pressure through the burning of various waste materials. Heretofore, efforts at combining refuse boilers with high pressure power boilers have often met with technical disadvantages because of differences in operating characteristics and method of operation between the two types of boilers. The known arrangement of connecting the fluid circuit of a refuse boiler in operative series with that of a high pressure power boiler as a so called economizer boiler requires a very high fluid pressure drop across the refuse boiler at full load in order to insure proper fluid flow distribution at low load and in cases where the refuse input is not controlled, means have to be provided to prevent fluid evaporation within the economizer boiler. These disavantages make it impractical to connect a refuse boiler in series with a large power boiler.

It is the primary object of this invention to eliminate the above-mentioned disadvantages. The invention solves the problem in that the refuse boiler is connected with the high pressure boiler in a parallel circuit, with the fluid cycle of each boiler being independent of the other. By this means, the operation of the refuse boiler will be suited to accommodate the input requirements of waste material and will remain independent of the output requirements imposed on the power boiler.

More specifically this parallel circuit arrangement of the refuse boiler and the power boiler can be accomplished in the following variations.

Firstly, in an arrangement where the available waste material provides a fuel source of relatively low heat value it is proposed that the refuse boiler be connected to supply steam to a low pressure feedwater heater located ahead of the deaerator in the power boiler condensate cycle. This arrangement is advantageous from the viewpoint of economics derived through the use of low pressure parts for the refuse boiler.

Secondly, in an arangement where the available waste material provides a fuel source of high heat value it is proposed that the refuse boiler be connected to supply steam to a high pressure feedwater heater located before the boiler inlet. This arangement is advantageous in that there will be no loss of thermal efficiency.

In both of the above-mentioned arrangements, a condenser is made available to the fluid cycle of the refuse boiler. This may be in the form of a stand-by condenser incorporated in the refuse boiler cycle or connecting lines allowing access to the power boiler condenser. A condensing means is necessary to insure complete operative independence between the refuse boiler and the power boiler. Thus in the event of a power boiler shutdown, the steam generated by the refuse boiler will be directed to the condenser and returned as feedwater for use in the refuse boiler.

Thirdly, there is an arrangement whereby the refuse boiler steam output is introduced into one of the low pressure stages of the power generator turbine. This arrangement requires that the refuse boiler be of the type capable of delivering a slightly superheated low pressure steam suitable for use in one of the intermediate stages of the low pressure turbine.

The following are some of the advantages of the parallel operative relationship achieved through the present invention by keeping the fluid cycles of the high pressure boiler system separate from that of the refuse boiler. The interdependency of operation between the two systems is eliminated so that even the shutdown of one system will not require a corresponding shutdown of the other. Economics will be derived in that the quality of the fluid passing through the low pressure refuse boiler will not be held to the same standards as would be required if it was the same fluid destined for use through the high pressure system; an exception to this is the alternative calling for the introduction of low pressure fluid in the power system turbine. Further economies are derived from the reduced cost of the low pressure parts required for the refuse boiler, the need for only a nominal quantity of controls and an elimination of the high fluid pressure drop requirement for proper flow distribution through the refuse boiler.

Figure 1:
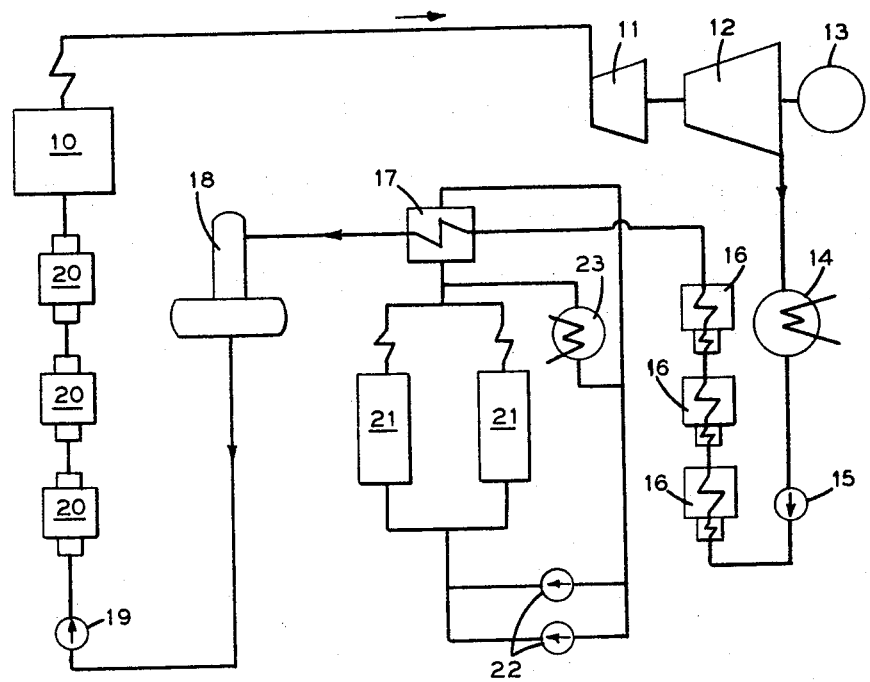
FIG. 1 is a diagramatic illustration of a typical high pressure power boiler system with refuse boilers connected to the low pressure section of the power system's fluid return circuit in accordance with the invention.

As can be seen from the drawings, in FIG. 1 a high pressure power boiler 10 generates high pressure steam which passes to a turbine generator consisting of a high pressure stage 11, a low pressure stage 12 and a generator 13, exhaust steam leaves the low pressure stage and is condensed in the main condenser 14 and the resultant feedwater passes through the low pressure return circuit consisting of a low pressure pump 15 followed by three turbine extraction type feedwater heaters 16, an indirect type heat exchanger 17 and a deaerator 18. High pressure pump 19 passes the feedwater into the high pressure return circuit consisting of three turbine extraction type feedwater heaters 20. The refuse boiler system consists of two refuse boilers 21 producing low pressure steam which passes through an indirect type heat exchanger 17 and exhausts and is pumped back as feedwater for the refuse boilers by pumps 22, a by-pass around heat exchanger 17 includes a stand-by condenser 23.

Figure 2:
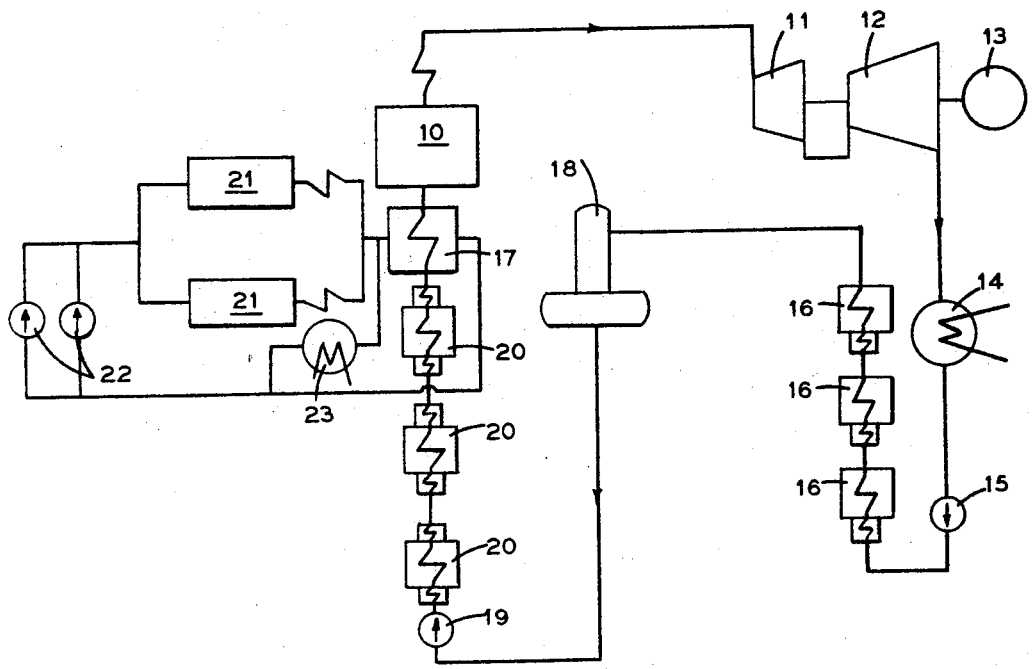
FIG. 2 is an alternate of FIG. 1 showing the refuse boilers connected to the high pressure section of the power system's fluid return circuit.

FIG. 2 illustrates an alternate arrangement which is similar to FIG. 1 with the exception of having heat exchanger 17 and the associated refuse boiler system located in the high pressure return circuit of the power boiler system following feedwater heaters 20.

Figure 3:
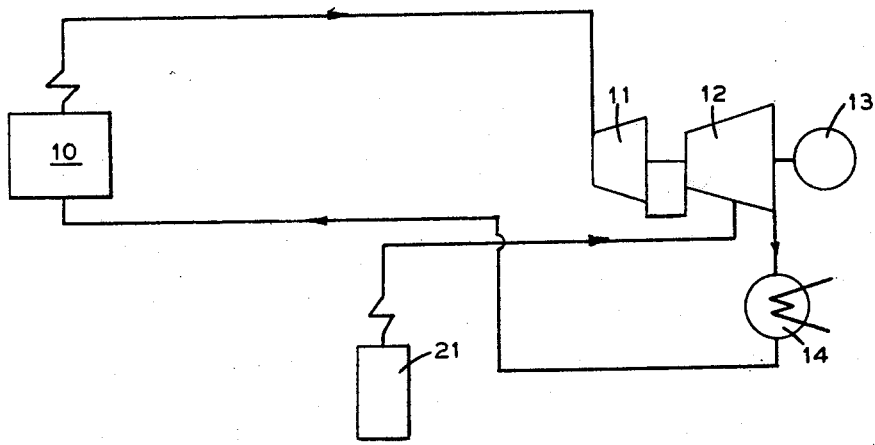
FIG. 3 is an alternate of FIG. 1 showing a refuse boiler connected to the low pressure stage of the power system's turbine.

FIG. 3 illustrates an alternate arrangement showing a high pressure power boiler system including a high pressure boiler 10 generating high pressure steam which passes to a turbine generator consisting of a high pressure stage 11, a low pressure stage 12 and a generator 13. Exhaust steam leaving the low pressure stage 12 passes through main condenser 14 and is returned as feedwater for the high pressure boiler. Refuse boiler 21 generates slightly superheated low pressure steam which passes to the turbine low pressure stage 12.

What is claimed is:

1. In a high pressure power electric generating system, said system comprising a high pressure power boiler, a turbine, means for generating high pressure fluid in said boiler, means for passing said fluid from the boiler to said turbine, a flow circuit for returning fluid from said turbine to said boiler, said flow circuit including a low pressure portion and a high pressure portion, a refuse burning boiler, means for generating relatively low pressure fluid in said refuse boiler by the combustion of refuse, and means for passing the low pressure fluid from said refuse boiler through the high pressure system in parallel operative relationship therewith.

2. A high pressure power electric generating system according to claim 1 wherein an indirect heat exchanger positioned in the fluid flow circuit leading to said high pressure power boiler, and said low pressure fluid from said refuse boiler is passed through said heat exchanger.

3. A high pressure power electric generating system according to claim 2 where said heat exchanger is positioned in the low pressure portion of said fluid flow circuit.

4. A high pressure power electric generatng system according to claim 2 where said heat exchanger is positioned in the high pressure portion of said fluid flow circuit.

5. A high pressure power electric generating system according to claim 1 wherein a condenser is arranged in series relationship with said refuse boiler, and in the event of shutdown of said high pressure power system, the low pressure fluid from said refuse boiler would pass through said condenser and be returned to said refuse boiler.

6. A high pressure power electric generating system according to claim 1 wherein the said turbine includes a low pressure stage, and means to pass the low pressure fluid produced by said refuse boiler directly to said turbine low pressure stage.

References Cited

UNITED STATES PATENTS

| | | | |
|---|---|---|---|
| 2,875,735 | 3/1959 | Falla | 122—2 |
| 3,118,429 | 1/1964 | Hochmuth | 122—7 |
| 3,314,231 | 4/1967 | Hochmuth | 122—7 XR |

KENNETH W. SPRAGUE, *Primary Examiner.*